July 14, 1970   C. H. BODE, JR., ETAL   3,520,181
CAMBER INDICATOR FOR CARRIAGE OF SLAB-CUTTING SAW
Filed March 18, 1968   2 Sheets-Sheet 1
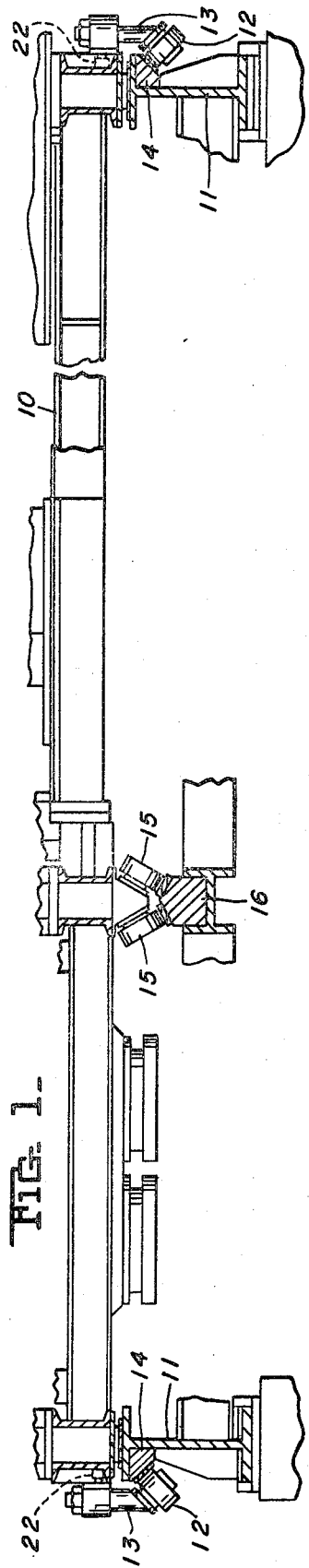
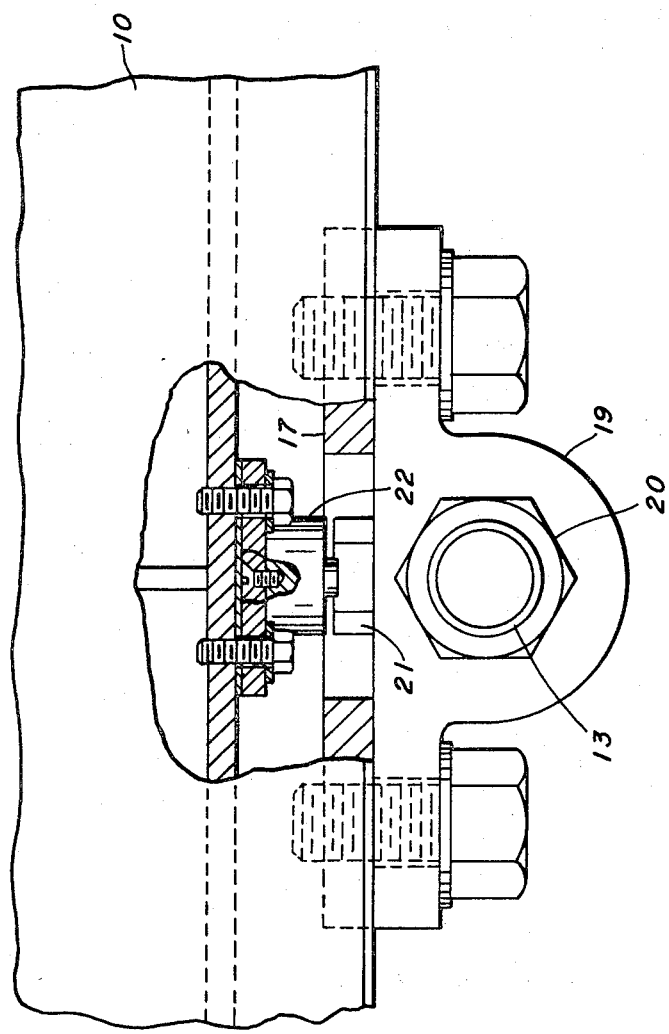
INVENTORS.
CHARLES H. BODE, JR. &
FRANCIS GALLUCCI
By J. Wallace Hopkins
Attorney July 14, 1970 C. H. BODE, JR., ETAL 3,520,181
CAMBER INDICATOR FOR CARRIAGE OF SLAB-CUTTING SAW
Filed March 18, 1968 2 Sheets-Sheet 2
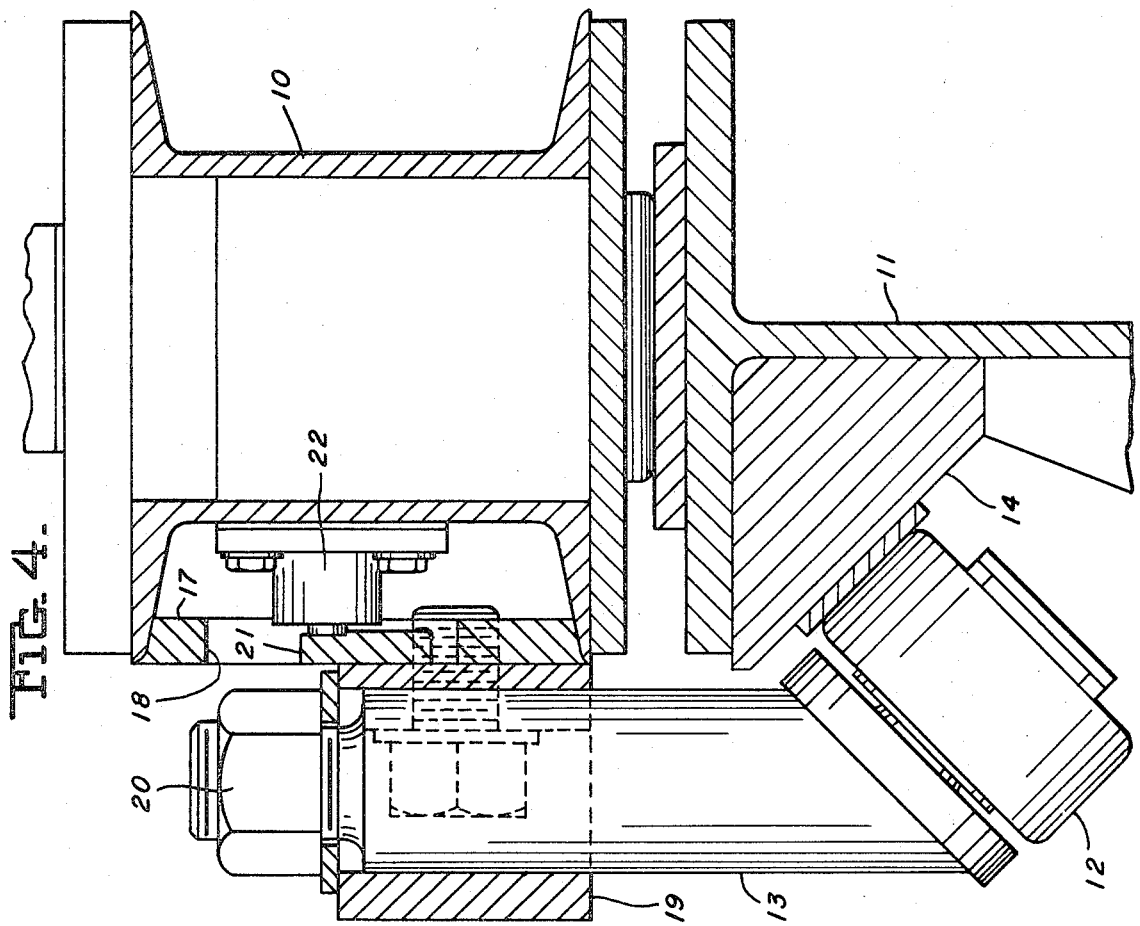
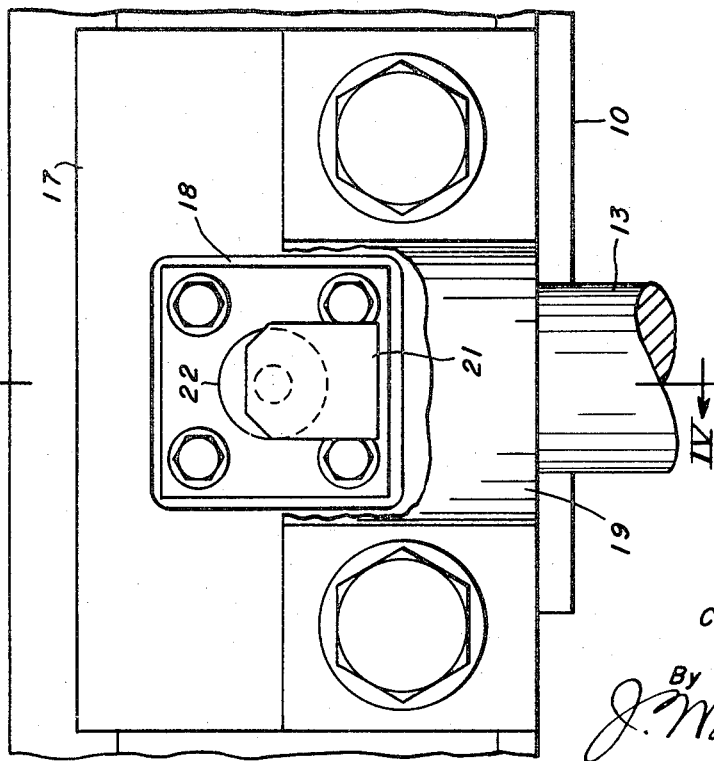
INVENTORS.
CHARLES H. BODE, JR. &
FRANCIS GALLUCCI
By
J. Wallace Hopkins
Attorney United States Patent Office 3,520,181
Patented July 14, 1970

3,520,181
CAMBER INDICATOR FOR CARRIAGE OF SLAB-CUTTING SAW
Charles H. Bode, Jr., Upper St. Clair Township, Allegheny County, and Francis Gallucci, North Huntington Township, Westmoreland County, Pa., assignors to United States Steel Corporation, a corporation of Delaware
Filed Mar. 18, 1968, Ser. No. 713,750
Int. Cl. G01e 5/00
U.S. Cl. 73—133                            4 Claims

ABSTRACT OF THE DISCLOSURE

A carriage movable along fixed rails with a slab issuing from a rolling mill clamped thereto is provided with downwardly extending posts adjacent its corners. Rollers journaled on the posts engage the rails and lateral force on the carriage as a result of camber in the slab effects a slight deflection of the posts and adjacent frame portions. Load cells are disposed to have force applied thereto by such deflection and affect indicator means to show the operator the magnitude of the lateral force on the carriage.

CROSS REFERENCE TO RELATED APPLICATION

The apparatus on which the present invention is particularly adapted to be used is disclosed and claimed in the co-pending application of Glenn N. Krueger, Ser. No. 488,933, filed Sept. 21, 1965, now Pat. No. 3,415,150 issued Dec. 10, 1968.

BACKGROUND OF THE INVENTION

This invention relates to means for indicating to the operator of a traveling slab-cutting saw, the camber in the slab (which is gripped between the rolls of a reducing-mill stand) by measuring the lateral force applied to the carriage on which the saw is mounted.

The aforementioned patent discloses a traveling saw carriage having means to clamp itself to a slab issuing from the rolls of a reducing mill. The carriage moves along with the slab in the path thereof, guided by fixed rails while a saw on the carriage makes a transverse cut therethrough. Camber which may occur in the issuing slab throws a lateral force on the carriage, since the slab is prevented from lateral movement by the grip of the rolls. If the camber is such that the resulting lateral force may cause damage to the carriage or its guide rails, it is necessary that the operator adjust the mill rolls to correct for excessive camber. Our invention provides means for indicating to the operator the force exerted on the carriage under this condition.

SUMMARY OF THE INVENTION

According to our invention, we mount means on the saw carriage, adapted to be slightly deflected by lateral force applied thereto. Control means affected by such deflection are connected in a circuit to an indicator of any conventional type. More specifically, we mount on the carriage frame adjacent each end thereof, downwardly extending posts having rollers journaled thereon engaging the rails guiding carriage movement. Lateral thrust applied to the carriage effects slight deflection of the posts and this is sufficient to cause a load cell to vary the reading of an indicator thus showing to the operator the abnormal condition.

BRIEF DESCRIPTION OF THE DRAWINGS

A complete understanding of our invention may be obtained from the following detailed description which refers to the accompanying drawings illustrating a present preferred embodiment.

In the drawings:
FIG. 1 is a side elevation of a saw-carriage frame showing in section the rails on which it travels;
FIG. 2 is a plan view partly in horizontal section of one of the posts showing a bracket by which it is mounted on the carriage;
FIG. 3 is an elevation of the parts shown in FIG. 2; and
FIG. 4 is a section taken along the plane of line IV—IV of FIG. 3.

DETAILED DESCRIPTION OF THE PREFERRED EMBODIMENT

Referring now in detail to the drawings and, for the present, particularly to FIG. 1, a rectangular frame 10 fabricated from structural members is slidably supported on rails 11. Movement of the frame 10 is guided by angled rollers 12 journaled at the lower ends of posts 13 extending downwardly from the frame adjacent the corners thereof. Rollers 12 engage filler bars 14 secured under the upper flanges of rails 11. Frame 10 is that of a traveling saw carriage as disclosed in the Krueger application and is subject to lateral forces (normal to rails 11) when a slab clamped by the carriage develops camber. Angled centering rollers 15 journaled intermediate the ends of the frame and engaging V-rail 16, together with rollers 12, normally keep the frame in its proper path.

FIGS. 2, 3 and 4 show in greater detail the mounting of posts 13 on frame 10. A plate 17 is welded to frame 10 adjacent each corner. The plate has a window 18 therein. A deadeye bearing sleeve 19 is secured to plate 17 with its bore vertical. A post 13 is snugly seated in the bore and secured to the bearing by a nut 20 screwed onto the reduced threaded upper end of the post. A filler block 21 positioned in window 18 is secured to the inner side of the sleeve and bears against a load cell 22 mounted thereadjacent on frame 10.

It is evident that a lateral force to the right on frame 10 as viewed in FIG. 4 will deflect plate 17 slightly and increase the pressure on cell 22. A force toward the left will have a similar effect on the cells at the opposite end of the frame. The cells at the two ends of frame 10 are preferably connected in a suitable circuit of known type with a conventional indicator such as the Honeywell R7161 "Versatronic" Controller, so as to provide the operator with a continuous indication of the lateral thrust on the saw-carriage frame, thus permitting corrective measures to be timely initiated before the force becomes excessive.

The advantage of our invention is readily apparent from the foregoing, i.e., it affords continuous monitoring of the lateral forces applied to the saw-carriage frame as a result of camber in the slab as it issues from the reducing mill while clamped to the carriage for sawing to length.

Although we have disclosed herein the preferred embodiment of our invention, we intend to cover as well any change or modification therein which may be made without departing from the spirit and scope of the invention as set forth in the claims.

What is claimed is:
1. In an apparatus which includes a frame adapted to receive an elongated product traveling in the direction of its length, means carried by said frame for clamping the frame to the product, and spaced apart rails supporting said frame for travel with the product as it is clamped thereto, said product being subject to camber, the occurrence of which imposes lateral forces on said frame while the frame is traveling with the product and clamped thereto, the combination with said apparatus of a device for indicating camber in the product, said device comprising means carried by said frame and engaging said rails and adapted to be deflected by lateral forces imposed on the frame, and load cells carried by said frame cooperable with said last-named means to be subject to pressure proportional in magnitude and direction to such deflection.

2. Apparatus as defined in claim 1, characterized by said last-named means including posts extending downwardly from said frame and rollers on said posts engaging said rails.

3. Apparatus as defined in claim 2, characterized by said rollers being journaled on the posts with their axes at an oblique angle to those of the posts.

4. Apparatus as defined in claim 1, characterized by each load cell being secured to a member of said frame, a plate secured to the frame overlying each cell and having a window therein and a sleeve secured to each plate with its axis vertical, said posts being fitted into said sleeves and extending downwardly therefrom.

References Cited

UNITED STATES PATENTS

| | | | |
|---|---|---|---|
| 3,415,150 | 12/1968 | Krueger | 83—319 |
| 3,322,220 | 5/1967 | Bash | 177—137 |
| 2,829,516 | 4/1958 | Chiesorin | 73—133 |
| 2,477,457 | 7/1949 | Hughes | 73—104 |

RICHARD C. QUEISSER, Primary Examiner

J. WHALEN, Assistant Examiner

U.S. Cl. X.R.

73—141; 83—319, 522